Patented Sept. 13, 1938

2,130,212

UNITED STATES PATENT OFFICE 2,130,212

TREATMENT OF POLYVINYL ALCOHOL

William W. Watkins, Buffalo, N. Y., assignor to E. I. du Pont de Nemours & Company, Wilmington, Del., a corporation of Delaware No Drawing. Application November 17, 1937, Serial No. 175,042

3 Claims. (Cl. 260—2)

This invention relates to new compositions of matter comprising polyvinyl alcohol and articles formed therefrom. More particularly, it relates to the treatment of polyvinyl alcohol to render the same insoluble.

Hitherto polyvinyl alcohol has been rendered water insoluble by certain organic reactions such as esterification or acetal formation, resulting in a product which cannot again be rendered water soluble by ordinary means. Polyvinyl alcohol itself, on the other hand, is soluble in water.

An object of this invention is to treat polyvinyl alcohol so as to render it insoluble in both cold and hot water. Another object is to so insolubilize polyvinyl alcohol that it can be rendered soluble in hot water by a simple treatment. Still another object is to treat polyvinyl alcohol whereby to render it opaque to ultra-violet light. A further object is to color polyvinyl alcohol. Other objects will appear hereinafter.

These objects are accomplished in general by immersing polyvinyl alcohol in an aqueous cuprammonium hydroxide solution.

The effect of cuprammonium hydroxide upon polyvinyl alcohol is apparently unique. Other similar metal ammonium complexes containing, for example, zinc, nickel and silver respectively have no apparent effect on polyvinyl alcohol. The same is true of such complexes as cuprammonium sulfate. The presence of neutral salts in the cuprammonium hydroxide, however, does not affect its action on polyvinyl alcohol.

In the practice of this invention the strength or concentration of the cuprammonium hydroxide solution, the length of time of immersion of the polyvinyl alcohol therein and the temperatures employed are to some extent interdependent and they also depend somewhat upon the degree to which it is desired to carry the reaction. It is seen that all these quantities may vary within wide limits, although it is preferred, of course, to operate at room temperature. The cuprammonium hydroxide may be applied to the polyvinyl alcohol in any form, such as coatings, films, threads, tubes or other shaped articles.

The resulting composition is green in color and is substantially opaque to ultra-violet light. It can again be rendered colorless and water soluble by treatment with mineral acids or ammonia.

The invention applies to any polyvinyl alcohol of any convenient viscosity. The polyvinyl alcohol may be modified by ester and/or acetal groups, as long as there are not sufficient modifying groups present to render the polyvinyl alcohol water insoluble.

The following examples are now given as illustrative but not limitative of the invention.

Example I

An 18% solution of polyvinyl alcohol maintained at 45° C. is extruded through a multiple hole spinneret into a coagulating bath of 40% ammonium sulfate maintained at 40 to 50° C. After a bath travel of approximately 24 inches, the thread is wound up on a bobbin at a rate of about 120 feet per minute. After washing, the thread is passed through a cuprammonium hydroxide bath, maintained at room temperature and containing 165 grams of ammonia, 30 grams of copper and 10 grams of sucrose per liter, at a rate sufficient to give it an immersion of three minutes. The thread is then washed and dried.

Example II

A 16.7% solution of polyvinyl alcohol in water is poured in the form of a film on to a glass plate and immersed in a bath containing 18% solution of ammonium sulfate for a period of one minute at room temperature. It is then removed from the bath, stripped from the plate, and thoroughly washed. The washed film is immersed in a bath comprising 11.8 grams of copper sulfate dissolved in 65.5 cc. of 28% ammonia, and 3.8 grams of sodium hydroxide dissolved in 34.5 cc. of water. After remaining in this bath for a period of two minutes, the film is withdrawn, washed and dried. The film is insoluble even in hot water and after a five minute exposure to the rays from a mercury vapor lamp (a powerful source of ultra-violet light), no trace of transmitted ultra-violet radiation can be detected with an orthochromatic photographic plate.

Example III

Cellulose acetate threads are impregnated with a 5% aqueous polyvinyl alcohol solution to which is added a small amount of a mixture of lauryl sodium sulfate and myristyl sodium sulfate as a wetting agent. The excess solution is squeezed out and the threads dried at 110° C. for several minutes. After drying, the threads are immersed in a cuprammonium hydroxide bath as in Example I for a period of three minutes. After washing and drying, the resulting material is an even pastel green and is found to be quite permanently sized when subjected to boiling water. If it is desired at a later time to boil off the size a slightly acid bath may be used which will decompose the complex.

*Example IV*

The same procedure is followed as in Example III except that the treatment is applied to threads after they are in the form of a fabric such as taffeta.

*Example V*

A piece of unsized cheesecloth is impregnated with a 2% solution of polyvinyl alcohol. After drying, the fabric is dipped in a cuprammonium hydroxide bath as in Example II for a period of three minutes and then washed and dried. The resulting fabric is quite difficult to wet and is permanently sized.

The present invention makes it possible to insolubilize polyvinyl alcohol in any physical form such as films, threads, coatings, etc. This is particularly desirable where water insensitivity is necessary, such as in a waterproof fabric or sizing for shower curtains, tents and other camping equipment, tennis nets, etc. Materials formed therefrom, particularly treated fabrics, are well protected from molds and fungus growths since metallic complexes of this character are fungicidal in action. It also finds use as an insulating material. It induces in the treated object a very attractive shade of green which absorbs ultraviolet light in the destructive regions. In the form of films, it is therefore particularly useful as protective coverings for foodstuffs, dyed materials, historical documents, etc.

In the case of cellulosic materials and silk sized with polyvinyl alcohol, the treating bath should preferably contain a suitable amount of some neutral salt to inhibit the swelling or dissolving action of cuprammonium hydroxide on these materials.

Any variation of or modification of the invention as it has been described above in this application which conforms to the spirit of the invention is intended to be included within the scope of the claims.

I claim:

1. A composition comprising polyvinyl alcohol treated with cuprammonium hydroxide solution.

2. An article comprising polyvinyl alcohol treated with cuprammonium hydroxide solution.

3. The method of treating polyvinyl alcohol comprising immersing polyvinyl alcohol in cuprammonium hydroxide solution.

WILLIAM W. WATKINS.